United States Patent
Yamada

[11] Patent Number: 5,341,081
[45] Date of Patent: Aug. 23, 1994

[54] VECTOR CONTROL APPARATUS FOR INDUCTION MOTOR

[75] Inventor: Tetsuo Yamada, Tokyo, Japan

[73] Assignee: Kabushiki Kaisha Meidensha, Tokyo, Japan

[21] Appl. No.: 102,220

[22] Filed: Aug. 5, 1993

[51] Int. Cl.[5] ............................................. H02P 7/00
[52] U.S. Cl. ........................................ 318/800; 318/805
[58] Field of Search ............................. 318/778–812, 318/632, 52, 432

[56] References Cited

U.S. PATENT DOCUMENTS

| | | | |
|---|---|---|---|
| 4,640,389 | 2/1987 | Kamaike | 318/807 X |
| 4,767,976 | 8/1988 | Mutoh et al. | 318/808 |
| 4,780,658 | 10/1988 | Koyama | 318/808 |
| 4,814,683 | 3/1989 | Okamoto et al. | 318/800 |
| 4,855,661 | 8/1989 | Okamoto et al. | 318/807 |
| 5,136,228 | 4/1992 | Yamada et al. | 318/808 |
| 5,155,797 | 10/1992 | Nomura et al. | 388/815 |

FOREIGN PATENT DOCUMENTS 4-165982 6/1992 Japan.
4-304183 10/1992 Japan.

OTHER PUBLICATIONS

Patent Abstracts of Japan, Publication No. JP 4-304183, Publication Date Oct. 1992, Abstract vol. 017134, Abstract Publication Date Mar. 1993.

*Primary Examiner*—Jonathan Wysocki
*Attorney, Agent, or Firm*—Foley & Lardner

[57] ABSTRACT

In a vector control apparatus for an induction motor, a divider (13) is provided which receives an exciting instruction $\lambda_{2d}*/M*$ from a secondary magnetic flux instruction amplifier ($1_1$) which outputs $\lambda_{2d}*/M*$ according to an angular frequency $\omega_r$ derived from a speed detector ($4_3$). The divider (13) receives an exciting inductance variation $A_{Mn}$ from the exciting inductance M' compensation circuit (12, 12') to divide $A_{Mn}$ by $\lambda_{2d}*/M*$ so that the derived output value is supplied to a first-order advance element calculation block ($1_2$) so that a target value $i_{1d}*$ in a d-axis component in a primary current of the induction motor is derived.

14 Claims, 7 Drawing Sheets

VECTOR CONTROL APPARATUS FOR INDUCTION MOTOR

BACKGROUND OF THE INVENTION (1) Field of the invention

The present invention relates to a vector control apparatus for a speed adjustable induction motor using a slip frequency control method. The vector control apparatus is so arranged as to compensate for variation in an exciting inductance.

(2) Description of the Background Art

Various types of a vector control apparatus for an induction motor have been proposed in which both a secondary magnetic flux and secondary current are controlled with no mutual interference.

Such a vector control as described above is a method in which in a case of a three-phase induction motor current and magnetic flux are handled as vectors in two-perpendicular d-q coordinate system (cartesian coordinate system) which is rotated at the same speed as a rotating magnetic field by means of a power supply angular frequency and the result of calculation of the vectors is converted into a current instruction value of each phase of the three-phase power supply. Such a vector control as described above is exemplified by a U.S. Pat. No. 5,136,228 issued on Aug. 4, 1992.

However, since, in a previously proposed induction motor vector control apparatus which achieves the above-described control method, no consideration is given to a field control, a calculation of correction for a slip is executed with an exciting current $i_{1d}$ constant, i.e., $i_{1d} = \lambda_{2d}/M$. In a region of field control, therefore, an accurate calculation of a set value of a slip angular frequency cannot be made. An exciting inductance $M'$ of the induction motor is varied according to a frequency and exciting current. Thus, if the exciting inductance is controlled with a ration of $M'$ to $I_o$ (exciting current) constant, an accurate control of torque becomes impossible. Especially, since $M'$ variation in a constant output region is large, an accuracy of torque at the constant output may be reduced.

Although an excitation instruction $\lambda_{2d}*/M*$ can be controlled to be constant in a constant torque range but is controlled so as to be inversely proportional to a motor angular frequency $\omega_r$ in a constant output range. Consequently, the exciting inductance M is largely varied in the constant output range in which the field control is carried out due to a magnetic saturation characteristic of an iron core of the induction motor and an accuracy of torque is deteriorated.

SUMMARY OF THE INVENTION

It is, therefore, a principle object of the present invention to provide an improved induction motor vector control apparatus which can achieve an improvement in a control accuracy of torque by compensating for variation in an exciting inductance over a whole motor operating range including a constant output range.

The above-described object can be achieved by providing an induction motor vector control apparatus, comprising: a) first means for deriving a target value of d-axis component $i_{1d}*$ and a target value of q-axis component $i_{1q}*$ of a primary current in the induction motor, said d and q axes being axes of a (d-q) coordinate system of cartesian coordinate system with a secondary magnetic flux being set as a reference axis and said (d-q) coordinate system being a rotating coordinate which rotates in synchronization with a power supply angular frequency of the induction motor; b) a first coordinate conversion block which is so constructed as to calculate a target value $i_{1\gamma}*$, $(=I_1)$ of a $\gamma$-axis component of the primary current and a phase $\phi$ on the basis of the derived target values of $i_{1d}*$ and $i_{1q}*$, said $\gamma$ axis and $\delta$ axis being on a $\gamma$-$\delta$ coordinate system which have a phase difference from the d-q axes by $\tan^{-1}(i_{1q}*/i_{1d}*)$ and with the primary current $I_1$ being a reference axis; c) second means for calculating target values $v_{1\gamma}*$ and $v_{1\delta}*$ of the $\gamma$-axis component and the $\delta$-axis component of a primary voltage of the induction motor on the basis of a ratio of a target value $\lambda_{2d}*$ of the d-axis component of a secondary magnetic flux of the induction motor to a target value of $M*$ of an exciting inductance $(\lambda_{2d}*/M*)$, calculation results of the target value of $I_1$ and phase $\phi$ of the first coordinate conversion block, and an instruction value $\omega_o$ of the power supply angular frequency; d) a second coordinate conversion block which is so constructed as to convert a detected value of the primary current in the induction motor into each $\gamma$-axis and $\delta$-axis component $i_{1\gamma}$ and $i_{1\delta}$ of the $\gamma$-$\delta$ coordinate system; and e) a slip angular frequency calculation block which is so constructed as to calculate a slip angular frequency on a calculation formula including a set value of a secondary time constant, wherein said first means includes a first-order advance element calculation block which is so constructed as to receive a derived value of a division of a value derived from a division of the target value $\lambda_{2d}*$ of the d-axis component of the secondary magnetic flux according to a rotor angular frequency of the induction motor by the target value $M*$ of an exciting inductance of the induction motor by a variation of the exciting inductance $M'$ so that the target value of $i_{1d}*$ is derived.

The above-described object can also be achieved by providing a vector control apparatus comprising: a) an induction motor; b) detecting means for detecting a rotor so angular frequency $\omega_r$ of the induction motor; c) secondary magnetic instruction amplifying means for deriving a ratio of a target value of a secondary magnetic flux in a d-axis component to a target value of an exciting inductance $\lambda_{2d}*/M*$ according to the rotor angular frequency $\omega_r$; d) a first-order advance element circuit which calculates as follows: $i_{1d}* = \lambda_{2d}*/M* (1+L_2*/R_2* \cdot S)$, wherein $i_{1d}*$ denotes a target value of a primary current in the induction motor in the d-axis component, $L_2*$ denotes a target value of a secondary inductance, and $R_2*$ denotes a target value of a secondary resistance, S denotes differential operator; e) (d, q)−($\gamma$, $\delta$) coordinate conversion block which is so constructed as to receive $i_{1d}*$ and $i_{1'}*$, (a target value of the primary current in the induction motor in a q-axis component, said d and q being in a d-q coordinate system which is rotated in synchronization with a power supply angular frequency, with a secondary magnetic flux in the induction motor as a reference axis and as to calculate the following phase difference $\phi$, $i_{1\gamma}*$, $\sin \phi$, $\cos \phi$: $\tan^{-1}(i_{1q'}*/i_{1d}*) = \phi$, $\sqrt{i_{1d}*^2 + 1_{1q'}*^2} = I_1$, wherein $I_1$ denotes a primary current of the induction motor, $I_1$ comprises an $i_{1\gamma}*$ component and $i_{1\delta}*$ component in $\gamma$-$\delta$ axes of $\gamma$-$\delta$ coordinate system with the primary current $I_1$ as a reference axis; f) an ideal voltage calculation block which is so constructed as to calculate the following:

$$v_{1\gamma}* = R_1 i_{1\gamma}* + M^{2*}/L_2* \cdot \omega_o \lambda_{2d}*/M* \cdot \sin \phi$$

$$v_{1\delta}{}^* = L_\sigma \omega_o i_{1\gamma}{}^* M^{2*}/L_2{}^* \cdot \omega_o \cdot \lambda_{2d}{}^*/M^* \cdot \cos\phi$$

wherein $\omega_o$ denotes a power supply angular frequency; g) a slip angular frequency calculation block which is so constructed as to calculate the slip angular frequency $\omega_s{}^*$ on the basis of $i_{1q}{}^*$ and $\lambda_{2d}{}^*/M^*$; h) a secondary resistance $R_2$ compensation amplifying means for calculating a secondary resistance variation K on the basis of $\Delta v_1 \delta$ wherein $\Delta v_1 \delta$ denotes an error voltage of the primary voltage $v_1$ in the $\delta$ axis; i) an M′ compensator which is so constructed as to calculate a variation in an exciting inductance on the basis of the following equation:

$$A_{Mn} = \Delta v_1 \delta_{In}/M^{2*}/L_2{}^* \cdot \omega_{on} \cdot \lambda_{2d}{}^*/M^*$$

wherein $\Delta v_1 \delta_{In}$ denotes $\delta$-axis error voltage at a measuring point n of the speed during no load operation, $\omega_o$ denotes a primary angular frequency at the measuring point n from the slip angular frequency calculation block; and j) a divider which receives both $\lambda_{2d}{}^*/M^*$ from the secondary magnetic flux instruction amplifier and $A_{Mn}$ from the M′ compensator and carries out a division so that a variation in the exciting inductance is compensated for $i_{1d}{}^*$.

DETAILED DESCRIPTION OF THE PREFERRED EMBODIMENTS

Figure 1:
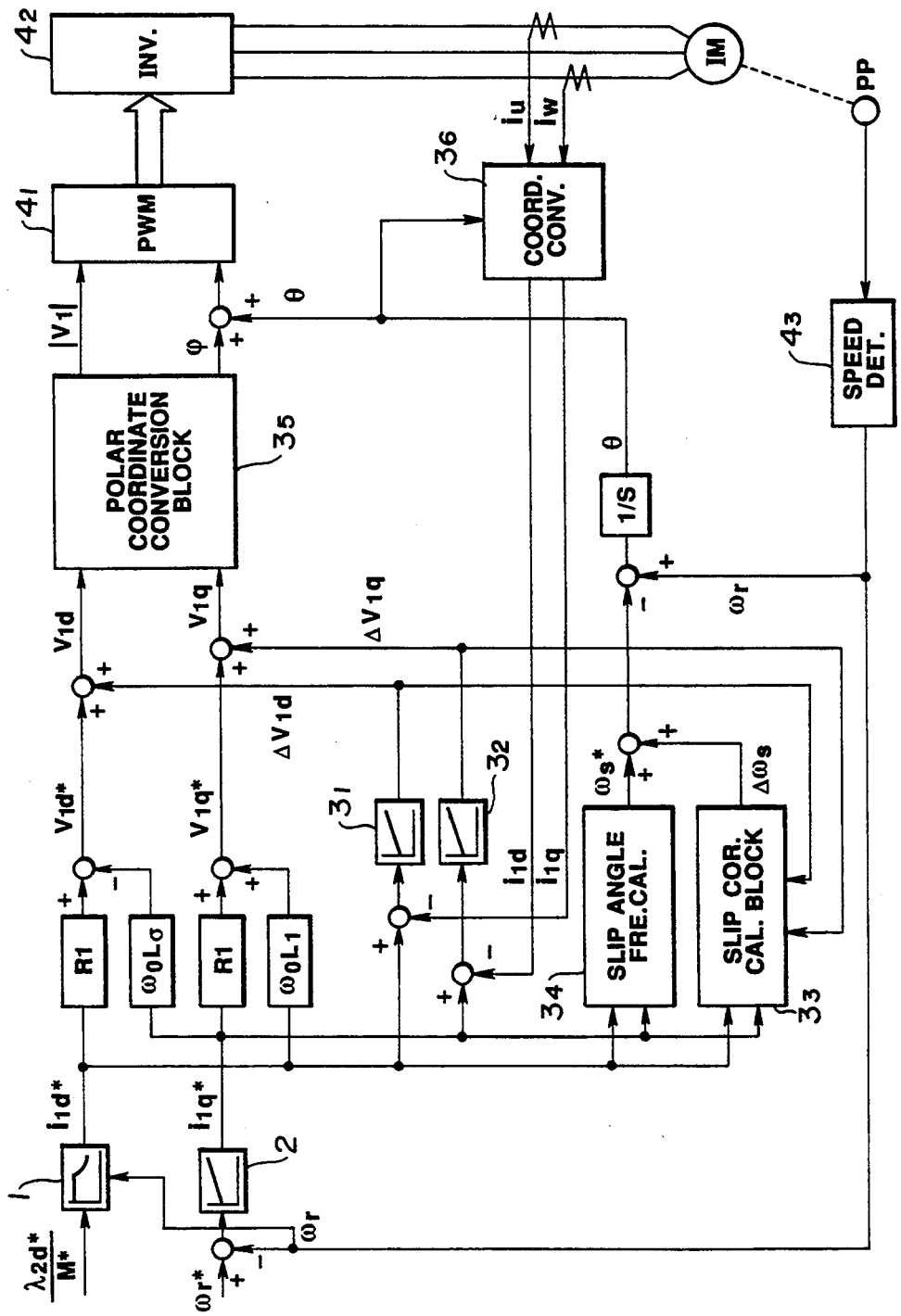
FIG. 1 is a circuit block diagram of a previously proposed induction motor vector control apparatus disclosed in a U.S. Pat. No. 5,136,228 issued on Aug. 4, 1992.

Reference will hereinafter be made to the drawings in order to facilitate a better understanding of the present invention.

Before explaining the preferred embodiments of an induction motor vector control apparatus, a previously proposed induction motor vector control apparatus will be described with reference to FIGS. 1 to 5.

A specific method of vector control in which, in a case where a three-phase induction motor is used, currents and magnetic fluxes are handled as vectors in a two-perpendicular d-q coordinate system (cartesian coordinate system) which is rotated at the same speed as a rotating magnetic field generated by means of a power supply angular frequency and the result of calculation for the vectors is converted into a current instruction value for each phase of a three-phase power supply.

Specifically, a voltage equation in the d-q coordinate system is expressed as:

$$\begin{bmatrix} v_{1d} \\ v_{1q} \\ 0 \\ 0 \end{bmatrix} = \begin{bmatrix} R_1 + L_\sigma P & -L_\sigma \omega & \dfrac{M}{L_2} P & -\dfrac{M}{L_2}\omega \\ L_\sigma \omega & R_1 + L_\sigma P & \dfrac{M}{L_2}\omega & \dfrac{M}{L_2} P \\ -\dfrac{R_2}{L_2} M & 0 & \dfrac{R_2}{L_2} + P & -\omega_s \\ 0 & -\dfrac{R_2}{L_2} M & \omega_s & \dfrac{R_2}{L_2} + P \end{bmatrix} \begin{bmatrix} i_{1d} \\ i_{1q} \\ \lambda_{2d} \\ \lambda_{2q} \end{bmatrix} \tag{1}$$

wherein $\omega_s = \omega - \omega_r$, $L_{94} = (L_1 L_2 - M^2)/L_2$.

It is noted that $v_{1d}$, $v_{1q}$ denote d-axis component and d-axis component of the primary voltage respectively.

$i_{1d}$ and $i_{1q}$ denote d-axis component and q-axis component of the primary current, respectively.

$\lambda_{2d}$, $\lambda_{2q}$ denote d-axis and q-axis components of a secondary magnetic flux, respectively.

$R_1$ and $R_2$ denote primary and secondary resistances, and $L_1 L_2$, and M denote primary, secondary, and exciting inductances, respectively.

$\omega$, $\omega_r$, $\omega_s$ denote a primary current power supply angular frequency, a rotator angular frequency, a slip angular frequency, respectively and P denotes d/dt.

It is noted that if the d axis is placed on a secondary magnetic flux vector as $\lambda_{2d}$, $\lambda_{2q}$ naturally equals 0. At this time, $\lambda_{2d} = \Phi_2 = $ constant, $i_{2d} = 0$, $i_{2q} = i_2$ (secondary current) so that a perpendicular control between the torque of the motor and magnetic flux can be achieved.

On the other hand, the secondary magnetic flux has the following relationship.

$$\left.\begin{array}{l} \lambda_{2d} = M i_{1d} + L_2 i_{2d} \\ \lambda_{2q} = M i_{1q} + L_2 i_{2q} \end{array}\right\} \tag{2}$$

If $i_{2d} = 0$ according to such a vector control condition as described above, $\lambda_{2q} = M i_{1d}$ from the above formula.

In addition, since $\lambda_{2q} = 0$, $i_{1q} = -L_2/M \cdot i_{2q}$ and $1_{1q}$ is proportional to a torque current $i_{2q}$.

Next, according to a fourth row of the matrix of the equation (1), an equation (3) is derived and if a condition to establish a slip angular frequency is derived from the equation (3), the slip angle frequency $\omega_s$ is expressed as:

$$-\dfrac{R_2}{L_2} M i_{1q} + \omega_s \lambda_{2q} = 0 \tag{3}$$

$$\therefore \omega_s = \frac{R_2}{L_2} \cdot \frac{Mi_{1q}}{\lambda_{2d}} = \frac{R_2}{L_2} \cdot \frac{Mi_{1q}}{Mi_{1d}} = \frac{R_2}{L_2} \cdot \frac{i_{1q}}{i_{1d}} \quad (4)$$

The above equations (3) and (4) represent the vector control condition when the secondary magnetic flux is controlled so as to become coincident with the d axis. Hence, in order to carry our the vector control, $i_{1d}$ is needed to set to $\lambda_{2d}/M$ and it is necessary for the slip angular frequency $\omega_s$ to be established in the equation (4).

The secondary resistance $R_2$ used to calculate the slip angular frequency $\omega_s$ in the equation (4) has its resistance which is varied according to an ambient temperature thereabout and self heating of a rotor. On the basis of the output voltage of the motor, a variation in the resistance value of $R_2$ is estimated. This variation is used to correct a target value of the slip angular frequency $\omega_s$ so that it is necessary to compensate for the generated torque variation due to the variation in the secondary resistance. Suppose that the variation component of the secondary resistance is neglected. At this time, a torque control accuracy and torque response characteristic are reduced. If, e.g., an output voltage of the inverter is directly used for the estimated change in the secondary resistance $R_2$, the output voltage of the inverter includes the change component of the primary resistance $R_1$. Therefore, as a signal used to estimate the variation of the secondary resistance, it is desirable to use a signal not dependent upon the primary resistance.

FIG. 1 shows the previously proposed vector control apparatus installed on the induction motor and disclosed in a U.S. Pat. No. 5,136,228.

An exciting current instruction block 1 serves to receive and process $\lambda_{2d}*/M*$ until the angular frequency $\omega_r$ exceeds a certain value to provide a target value $i_{1d}*$ for $i_{1d}$ and to receive and process $\lambda_{2d}*/M*$ so as to provide a smaller $i_{1d}*$ when $\omega_r$ exceeds a certain value.

It is noted that * denotes a target value or an ideal value. If a deviation of a speed instruction $\omega_r*$ and of $\omega_r$ is changed to $i_{1q}*$ via a speed amplifier 2, ideal values $v_{1d}*$ and $v_{1q}*$ of the primary voltage on the d-q axis are calculated on the basis of $i_{1d}*$ and $1_{1q}*$ so that corrections of the voltage variations due to the changes of the primary and secondary resistances are carried out to derive $i_{1d}*=i_{1d}$ and $i_{1q}*=i_{1q}$.

A proportional-integral amplifier $3_1$ derives $\Delta v_{1d}$ by controlling $i_{1d}*=i_{1d}$. Another proportional-integral amplifier $3_2$ derives $\Delta v_{1q}$ by controlling $i_{1d}*=i_{1d}$.

$\Delta v_{1d}$ and $\Delta v_{1q}$ include voltage variations due to changes in the primary resistance and secondary resistance. Therefore, if the compensation for the change in the secondary resistance is carried out by deriving the components not including the voltage variations due to the change in the primary resistance, the compensation therefor which is not affected by the change in the primary resistance becomes possible.

Assuming that a rotational coordinate $\gamma$-$\delta$ axis of the rotational axis is arranged with a reference axis $\gamma$ placed on the vector denoting the primary current $I_1$, a slip correction calculation block $3_3$ derives the primary current variation $\Delta v_1 \delta$ on the $\delta$ axis.

The term $\Delta v_1 \delta$ is expressed in an equation not including the primary resistance $R_1$ and, hence, receives no influence from the primary resistance $R_1$.

Figure 2:
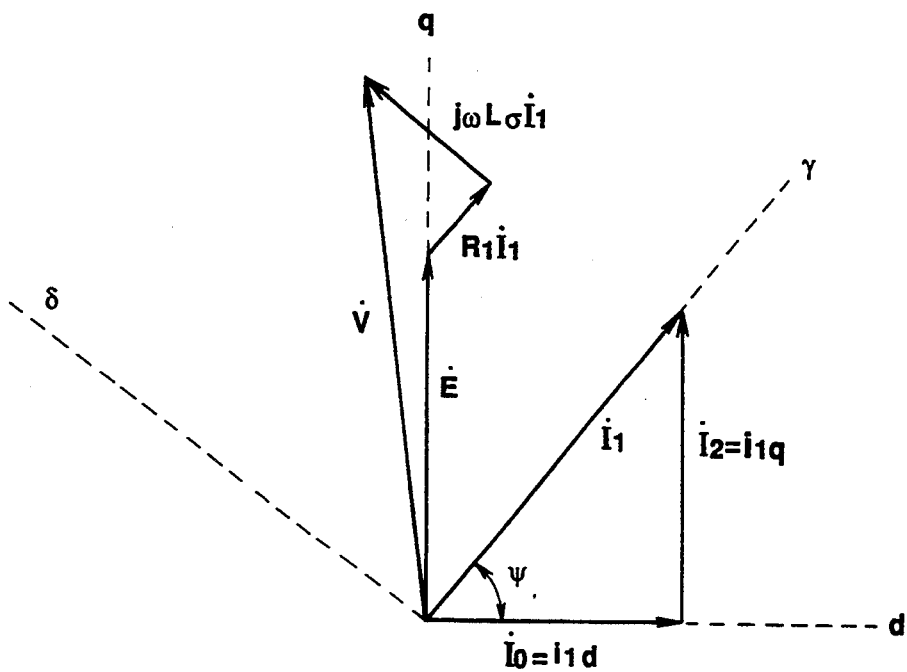
FIGS. 2 and 3 are characteristic graphs of vectors in a d-q coordinate system of a cartesian coordinate type for explaining an operation of the induction motor vector control system shown in FIG. 1.

FIG. 2 shows a vector spatial view of the primary voltage variation.

Figure 3:
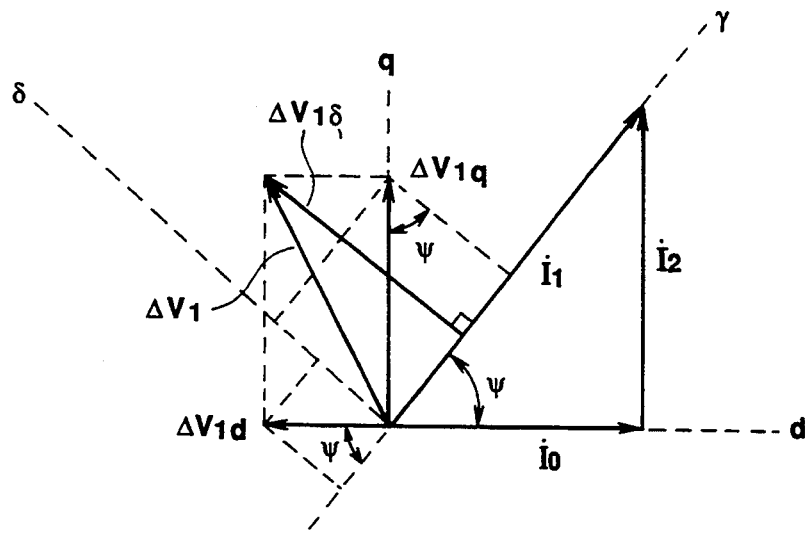

FIG. 3 shows a vector spatial view of a relationship between voltage and current on the d-q axis and the $\gamma$-$\delta$ axis.

In FIGS. 2 and 3, $V_1$ and E denote the primary voltage and secondary voltage, $\Delta v_1$ denotes the primary voltage variation, $\Delta v_1 \gamma$ and $\Delta v_1 \delta$ denotes $\gamma$-axis component of the variation and $\delta$-axis component of the variation in the primary voltage, $\phi$ denotes a phase difference between the $\gamma$ axis and d axis, $I_o$ denotes an excitation current, and $I_2$ denotes a torque component current. $\Delta v_1 \delta$ is expressed in the following:

$$\Delta v_1 \delta = -\Delta v_{1d} \sin \phi + \Delta v_{1q} \cos \phi \quad (5)$$

wherein $\cos \phi = I_o/I_1 = i_{1d}/i_1 \delta$, $\sin \phi = I_2/I_1 = i_{1q}/i_1 \gamma$.

Then, the slip correction calculation block $3_3$ calculates a correction $\Delta \omega_s$ of the slip angular frequency corresponding to the change in the secondary resistance on the basis of $\Delta v_1 \delta$. With an added value between $\omega_s*$ and $\Delta \omega_s$ derived in the slip angular frequency calculation block $3_4$ as a target value of the slip angular frequency, a rotor angular frequency $\omega_r$ is added to provide a target value of the primary voltage angular frequency $\omega = d\theta/dt$.

Referring back to FIG. 1, $3_5$ denotes a polar coordinate conversion block, $4_1$ denotes a PWM (Pulse Width Modulation) circuit, $4_2$ denotes an inverter, IM denotes an induction motor, PP denotes a pulse pick up circuit, and $4_3$ denotes a speed detector.

(a) As described above, both the primary voltages variations $\Delta v_{1d}$ and $\Delta v_{1q}$ include the variations in the primary resistance and secondary resistance, respectively. Therefore, in the circuit shown in FIG. 1, the slip correction calculation block $3_3$ calculates $\Delta_1 \delta$ which does not receive the influence of the variation in the primary resistance from $\Delta v_{1d}$ and $\Delta v_{1q}$ and calculates $\Delta \omega_r$ from $\Delta v_1 \delta$.

(b) In a case where the field control is carried out, the values of $\lambda_{2d}$ and $i_{1d}$ have the following relationships of equation (6) from a third row of the equation (1). In addition, since $\lambda_{2q}=0$, an equation (7) is established.

$$-\frac{R_2}{L_2} Mi_{1d} + \left(\frac{R_2}{L_2} + P\right)\lambda_{2d} - \omega_s \lambda_{2q} = 0 \quad (6)$$

$$\begin{aligned} i_{1d} &= \frac{L_2}{R_2} \cdot \frac{\lambda_{2d}}{M} \cdot \left(\frac{R_2}{L_2} + P\right) \\ &= \frac{\lambda_{2d}}{M}\left(1 + \frac{L_2}{R_2} P\right) \end{aligned} \quad (7)$$

It will be appreciated from the equation (7) that a first-order advance is used to control $i_{1d}$ with respect to the change in the secondary magnetic flux $\lambda_{2d}$ during the field control. In details, when a field instruction $\lambda_{2d}*$ is varied, $\lambda_{2d} \neq Mi_{1d}$.

However, in the previously proposed vector control apparatus shown in FIG. 1, since no consideration is given to the field control, a theoretical evolution is carried out with the exciting current $i_{1d}$ constant, i.e., $i_{1d} = \lambda_{2d}/M$ so as to execute the slip correction calculation.

Therefore, in the field control range, the set value of the slip angular frequency cannot accurately be carried out.

Figure 4:
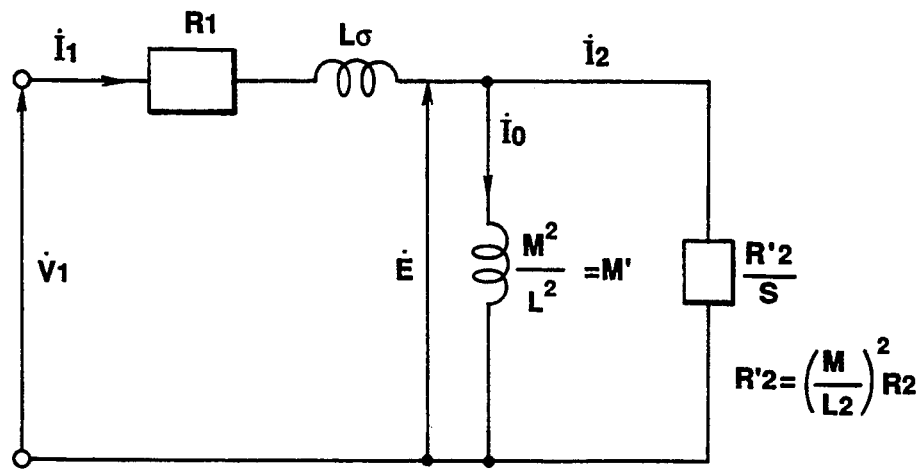
FIG. 4 is a circuit block diagram of an equivalent circuit of an induction motor.

FIG. 4 shows an equivalent circuit of the induction motor to which the vector control is applicable.

Figure 5:
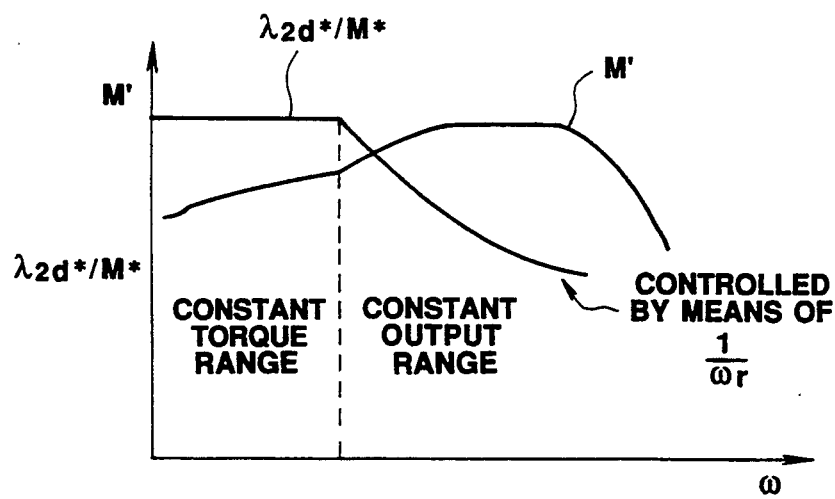
FIG. 5 is a characteristic graph of relationship between a primary angular frequency $\omega_o$ and exciting inductance M′ and relationship between $\omega_o$ and exciting instruction.

The exciting inductance M' is varied according to the frequency and exciting current to represent the characteristic shown in FIG. 5.

Thus, with M': $I_o$ constant, the accurate control of torque becomes impossible.

Particularly, the variation of M' in a constant output range is large, as shown in FIG. 5, and a torque accuracy at the constant output range may be reduced.

Although the excitation instruction $\lambda_{2d}*/M*$ is controlled to be constant in a constant torque range shown in FIG. 5, $\lambda_{2d}*/M*$ is controlled at a constant output range in a reverse proportion to the rotor angular frequency $\omega_r$ of the motor as shown in FIG. 5.

Hence, the exciting inductance M' is largely varied due to a magnetic saturation characteristic at the constant output range in which the field control is carried out so that the torque control accuracy can be reduced.

FIRST EMBODIMENT

Figure 6:
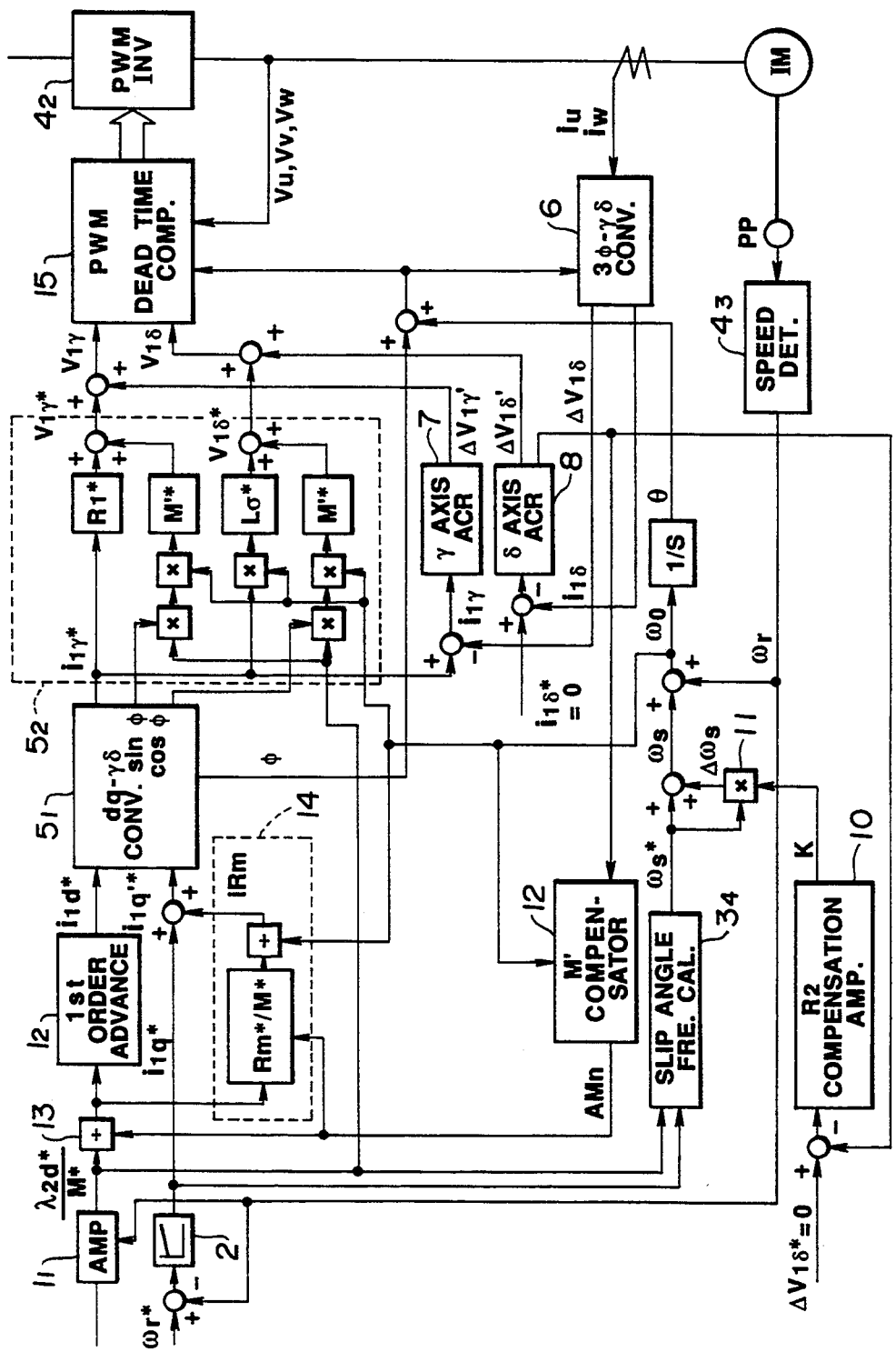
FIG. 6 is a circuit block diagram of first and third preferred embodiments of the induction motor vector control apparatus according to the present invention.

FIG. 6 shows a first preferred embodiment of the induction motor vector control apparatus according to the present invention.

It is noted that the same reference numerals as those shown in FIG. 6 are like elements recited in FIG. 1.

In FIG. 6, a secondary magnetic flux instruction amplifier $1_1$ serves to output $\lambda_{2d}*/M*$ according to the rotor angular frequency $\omega_r$ derived from a speed detector $4_3$.

It is noted that the output $\lambda_{2d}*/M*$ of the secondary magnetic flux instruction amplifier $1_1$ becomes smaller according to the rotor angular frequency $\omega_r$ as the angular frequency of $\omega_r$ exceeds a certain threshold value and falls in a field control range.

Referring back to FIG. 6, a first-order advance circuit $1_2$ is provided to execute a calculation of the equation (7), that is, $i_{1d}* = \lambda_{2d}*/M*(1+L_2*/R_2*\cdot S)$.

S denotes an S plane and $S = \sigma + j\omega$.

At the subsequent stage of the first-order advance circuit $1_2$, a first coordinate conversion circuit $5_1$ is provided to function as a calculation of a phase difference $\phi$ between $i_{1r}*$ and d axis, and $i_{1r}*$ and $\gamma$ axis in the $\gamma$-$\delta$ coordinate with the primary current $I_1$ as a reference axis on the basis of $i_{1d}*$ from the first-order advance element circuit $1_2$ and $i_{1q}*$ from an adjacent adder.

Specifically, the first coordinate conversion circuit $5_1$ executes the following calculation.

$$\tan^{-1}(i_{1q}*/i_{1d}*) = \phi,$$

$$\sqrt{(i_{1d}*^2 + i_{1q}'*^2)} = I_1$$

An ideal voltage calculation block $5_2$ enclosed by a broken line serves to calculate a first primary voltage target value i.e., $v_{1r}*$ and $v_{1\delta}*$ and to execute the following equation (8) using sin $\phi$, I, and cos $\phi$ output from the first coordinate conversion circuit $5_1$, using $\lambda_{2d}*/M*$, and using the power supply angular frequency $\omega_o$.

$$v_{1\tau}* = R_1 i_{1\tau}* + \frac{M^{2*}}{L_2*} \cdot \omega_0 \cdot \frac{\lambda_{2d}*}{M*} \sin\phi \quad (8)$$

$$v_{1\delta}* = L_\sigma \omega_0 i_{1\tau}* \frac{M^{2*}}{L_2*} \cdot \omega_0 \cdot \frac{\lambda_{2d}*}{M*} \cos\phi$$

Referring back to FIG. 6, a second coordinate conversion circuit 6 is provided to serve to convert detected values $i_u$, $i_w$ of the three-phase primary current into each axial component $i_1\gamma$, $i_1\delta$ in the $\gamma$-$\delta$ coordinate system.

Each of the axial components $i_1\gamma$ and $i_1\delta$ is correspondingly compared with its target value $i_1\gamma*$ and its target value $i_1\delta*$ ($=0$) at each subtractor.

Their compared difference results are input to PI (Proportional-Integral) amplifiers ($\gamma$ axis ACR) 7, 8 ($\delta$ axis ACR), respectively.

The P-I amplified values of $\Delta v_1\gamma'$ and $\Delta v_1\delta'$ are output from the PI amplifiers 7, 8, $\Delta v_1\gamma$ being added to $\Delta v_1\gamma'*$ and $\Delta v_1\delta'$ being added to $\Delta v_1\delta*$ to be supplied to the PWM dead time compensator 15 as $v_1\gamma$, $v_1\delta$.

Referring back to FIG. 6, a slip angular frequency calculation block $3_4$ serves to receive $\lambda_{2d}*/M*$ from the exciting current instruction amplifier $1_1$ and $i_{1q}*$ from the speed amplifier $1_1$ and to derive the slip angular frequency $\omega_s*$.

It is noted that the circuits shown in FIG. 6 can be achieved by a computer system so that the slip angular frequency $\omega_s*$ can be derived as follows:

A series of calculation operations including the secondary resistance variation K and slip angular frequency $\omega_s*$ are executed in a real time on the basis of its clock signal and the secondary resistance value derived in the (n−1)th order in a slip angular frequency calculation block $3_4$ is a set value at the n-th number calculation.

Suppose that K and $R_2$ derived in the n-th order calculation are represented by $K_n$, $R_{2n}$, respectively.

When a previously set value $R_2*$ is allocated to an initial value $R_{20}$ of $R_{2n}$, the calculations from the first order to n-th order are as follows:

1-st order
$R_{21} = (1 + K_1) \cdot R_{20} = (1 + K_1) \cdot R_2*$
2-nd order
$R_{22} = (1 + K_2) \cdot R_{21}$
$= (1 + K_2) \cdot (1 + K_1) \cdot R_2*$
.
.
.
n-th order
$R_{2n} = (1 + K_n) \cdot R_{2(n-1)}$
$= (1 + K_n)(1 + K_{n-1}) \ldots (1 + K_1) \cdot R_2*$ Hence, if $\omega_s$ to be derived at the n-th order calculation is represented by $\omega_{sn}$, $\omega_{sn}$ is expressed as:

$$\omega_{sn} = (1+K) \cdot \omega_{s(n-1)} \quad (9)$$

$\omega_{sn}$ is thus derived using $K_n$ derived from the equation (9) with $\omega_{s(n-1)}$ derived in the (n−1)th order calculation stored in a memory area.

In this case, the initial value $\omega_{s1}$ is derived from the following equation:

$$\omega_{s1} = (1+K_1) \cdot R_2* \cdot 1/L_2* \cdot i_{1q}*/(\lambda_{2d}*/M*)$$

$\omega_s$ thus derived is added to a rotor angular frequency detected value $\omega_r$ of the induction motor IM, the added value $\omega_o$ being a target value of the power supply angular frequency. The added value $\omega_o$ is supplied to 1/S differentiator and to the PWM dead time compensation circuit 13 and $3\phi - \gamma\delta$ coordinate converter 6 via an adder.

Referring back to FIG. 6 a secondary resistance variation amplifier (variation compensation circuit) 10 is provided to output a secondary resistance variation K to be added to an output of $\omega_s*$ of the slip angular frequency calculation block 34. A multiplier 11 receives $\omega_s*$ and K.

As described above, even if $\omega_s*$ is varied, the amplifier output K of the secondary resistance variation amplifier 10 may be constant since the secondary resistance variation K is derived from the secondary resistance variation compensation circuit 10.

Consequently, even if $\omega_s*$ is abruptly varied with both of torque current instruction $i_{1q}*$ and exciting current instruction $\lambda_{2d}*/M*$ varied, a response to the compensation of the secondary resistance becomes favorable.

An M' compensation circuit 12 is provided for a compensation for the exciting inductance M'.

This circuit 12 serves for the speed of the motor IM to be set to several points in a whole operating range during a no load operation (for example, the operation of IM is carried out at 20 points from 1/20·Nmax– ~Nmax·Nmax denotes a maximum rotation frequency).

At each point to be measured, $\Delta V_1 \delta_n$ or $\Delta V_1 \delta_{IN}$ (n denotes the data number corresponding to each point of measurement) is measured and an exciting inductance variation $A_{Mn}$ is derived from the equation (10).

$$A_{Mn} = \frac{\Delta V_1 \delta_{In}}{\frac{M^{*2}}{L_2^*} \cdot \omega_{on} \cdot \frac{\lambda_{2d}*}{M*}} \quad (10)$$

In the above equation (10), $\Delta v_1 \delta_n$ denotes an error voltage in the $\delta$ axis at the measuring point n and $\omega_{on}$ denotes a primary angular frequency at the measuring point n. The exciting inductance variation $A_{Mn}$ is used to derive the exciting inductance $M'_n*$ from the equation (11).

$$M^*_n = \left(\frac{M^{*2}}{L_2^*}\right)_n = (1 + A_{Mn}) \cdot \frac{M^{*2}}{L_2^*} \quad (11)$$

In the equation (11), $M_2*/L_2*$ denotes an initial set value of the exciting inductance M'*.

Using the initial set value of M'* a variation plotted data on M* is prepared and a straight line interpolation is executed between the plotted data.

Next, an ideal voltage calculation of an equation (12) is carried out by the ideal voltage calculation block $5_2$ using the derived M'*.

$$\begin{aligned} v_{1\tau}* &= R_1 i_{1\tau}* + L_\sigma P i_{1\tau}* + \frac{M^{2*}}{L_2^*} \omega_0 \frac{\lambda_{2d}*}{M*} \sin\phi \\ &= R_1\left(1 + \frac{L_\sigma}{R_1} P\right) i_{1\tau}* + \frac{M^{2*}}{L_2^*} \omega_0 \frac{\lambda_{2d}*}{M*} \sin\phi \\ v_{1\delta}* &= L_\sigma \omega_0 i_{1\tau}* + \frac{M^{2*}}{L_2^*} \omega_0 \frac{\lambda_{2d}*}{M*} \cos\phi \end{aligned} \quad (12)$$

If M* of the exciting instruction $\lambda_{2do}*/M*$ is replaced with M'* and is calculated, the exciting instruction is also varied correspondingly to the variation of the exciting inductance. In this way, the accurate control of the secondary magnetic flux $\lambda_{2d}$ can be carried out so that the torque control accuracy over the whole operating range can be improved.

It is necessary to compensate both exciting inductance set value $M'* (=M*^2/L_2*)$ and M* of the exciting instruction $\lambda_{2d}*/M*$ (equivalent to M'*) when the exciting inductance is compensated using the data of the exciting inductance variation $A_{Mn}$ measured during the no load operation. When $v_1\delta*$ and $v_1\delta*$ are calculated in the equation (8), it is necessary to calculate $M* \times \lambda_{2d}*M*$.

However, since $M* \times \lambda_{2d}*/M* = M'* \times \lambda_{2d}*/M*$ an influence of the variation of M' is equivalently compensated because of the presence of M'*/M*.

In addition, the slip angular frequency $\omega_s *$ is calculated as:

$$\omega_s* = \frac{R'_2*}{M*} \cdot \frac{i_{1q}*}{\lambda_{2s}*/M*} \quad (13)$$

It is noted that $R'_2 = (M/L_2)^2 \cdot R_2$, $M' = M^2/L_2$.

A term of M'*/M* appears in the calculation of $\omega_s*$ as in the equation (13).

Therefore, the effect of the variation of M' is equivalently compensated in the same way as described above.

The compensation of the M' variation may only be achieved by execution of a part in which the exciting current instruction $i_{1d}*$ is calculated.

Thus, referring back to FIG. 6, if the exciting inductance variation $A_{Mn}$ from the M' compensation circuit 12 and $\lambda_{2d}*/M*$ from the speed amplifier $1_1$ are divided by the divider 13 are input to the first-order advance circuit $1_2$, the effect of M' variation can thereby be compensated for.

SECOND EMBODIMENT

Figure 8:
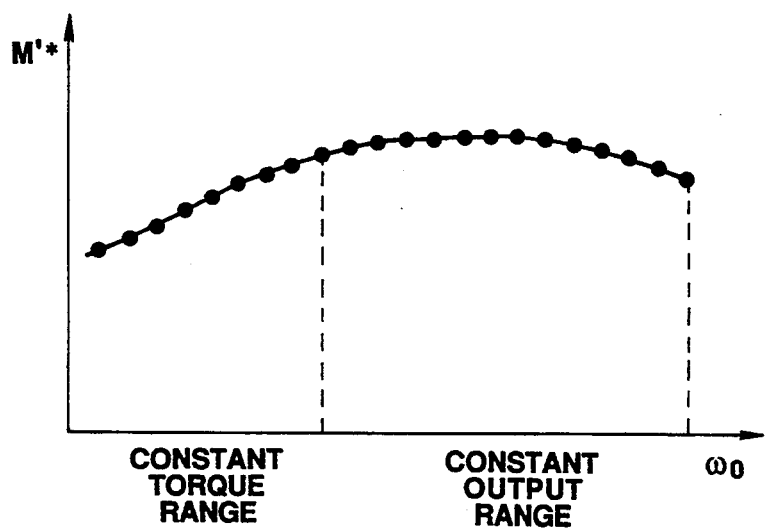
FIG. 8 is a characteristic graph indicating a variation plotted data of the exciting inductance.

FIG. 8 shows a second preferred embodiment of the induction motor vector control apparatus.

$i_{1d}*$ is calculated using the following equation (14) when the first-order advance element calculation block $1_2$ does not calculate the M' compensation.

$$i_{1d}* = \lambda_{2d}*/M* \times (1 + S \cdot M'*/R_2'*) \quad (14)$$

As appreciated from the equation (14), $\lambda_{2d}*/M* \times M'*$ appears in a differential term attached with S of the equation (14). Thus, a term of a differential time constant of the first-order advance element is canceled from the influence of M' variation as in the case of $\omega_2*$ in the equation (13).

Figure 7:
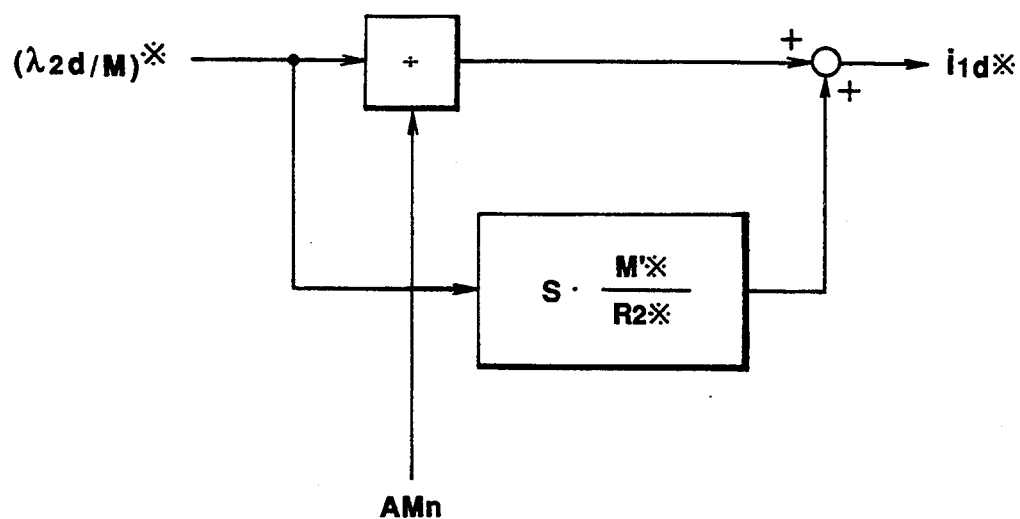
FIG. 7 is a circuit block diagram of an essential part of a second preferred embodiment of the induction motor according to the present invention.

The circuits shown in FIG. 7 can achieve the above-described cancellation of the M' variation. In other words, the term of the first-order advance differential is not needed to compensate for M' compensation.

An equation (15) expresses $i_{1d}*$ shown in FIG. 7.

$$i_{1d}* = \left(\frac{\lambda_{2d}*}{M*}\right) \cdot \frac{1}{A_{Mn}} + S \cdot \frac{M*}{R_2'*} \cdot \frac{\lambda_{2d}*}{M*} \quad (15)$$

THIRD EMBODIMENT

FIG. 6 shows a third preferred embodiment of the induction motor vector control apparatus as in the same way as the first embodiment.

The third embodiment shown in FIG. 6 serves to compensate for M' variation compensation in the case where an iron loss compensation of FIG. 6 is carried out.

That is to say, since the iron loss compensation current $I_{RM}$ is given as:
$I_{RM} = R_m*/M* \times \lambda_{2d}*/M* \times 1/\omega_o$, the influence of M' variation is received. To avoid the influence of M' variation, the exciting inductance $A_{Mn}$ is given to a term of $R_n*/M*$ of an iron loss compensation circuit 14.

The compensation calculation described above is given as follows:

$$T_{RM} = \frac{R_m*}{M*} \cdot \frac{1}{A_{Mn}} \times \frac{\lambda_{2d}*}{M*} \cdot \frac{1}{A_{Mn}} \times \frac{1}{\omega_o} \quad (16)$$

Referring back to FIG. 6, a PWM dead time compensation circuit 15 is provided adjacent to a PWM inverter.

The circuit denoted by 15 is exemplified by a U.S. Pat. No. 5,136,228 issued on Aug. 4, 1992 as the reference numeral 41 (the disclosure of which is herein incorporated be reference).

FOURTH EMBODIMENT

Figure 9:
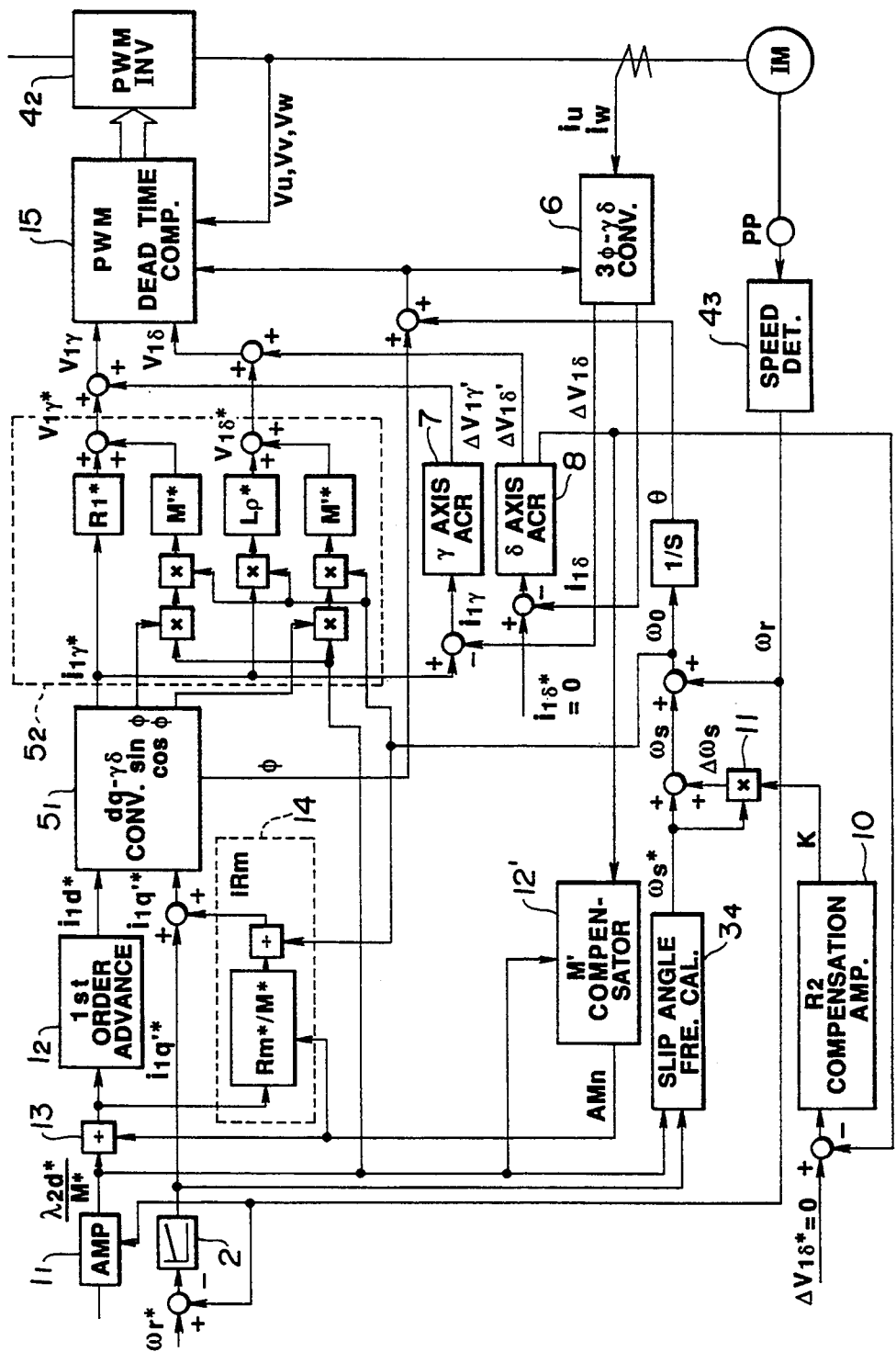
FIG. 9 is a circuit block diagram of a fourth preferred embodiment of the induction motor vector control apparatus according to the present invention.

FIG. 9 shows a fourth preferred embodiment of the induction motor vector control apparatus according to the present invention.

In the first, second, and third embodiments, with a slight variation of exciting inductance M' occurring to the slip angle frequency even through in the constant torque range taken into consideration, the variation data of M' with respect to the first-order angular frequency (output so frequency) $\omega_o$ are measured so as to compensate for the variation of M'.

However, a winding up machine applicable to a steel assembly line is demanded to undergo the same control as in the case of the DC motor in order to execute a tension constant control. In other words, the target value $i_{1q}*$ of the primary current (torque current) is set as a tension instruction and a compensation of the increased number of turns of windings is carried out by means of the exciting instruction $\lambda_{2d}*/M*$.

At this time, the exciting instruction is varied in proportion to a diameter of wound coil. In this case, since the exciting instruction is determined according to the diameter of wound coil not determined according to the frequency, the processing becomes facilitated when the M' variation data (or alternatively, $A_{Mn}$ variation data) is formatted in a data table as the variation data with respect to the exciting instruction.

In the fourth embodiment, the speeds of the motor are set at several points in the constant output range during no load operation and at each measurement point of speed $\Delta v_1\delta_n$ is measured so as to derive the exciting inductance variation $A_{Mn}$ from the equation (10).

This variation is formatted in the data table of the exciting instruction (in the constant output range, the exciting instruction gives $\lambda_{2d}*/M* \infty 1/\omega_r$).

It is noted that the difference in the circuit structure from the first through third embodiments is the compensation circuit 12' according to the exciting instruction value.

Figure 10:
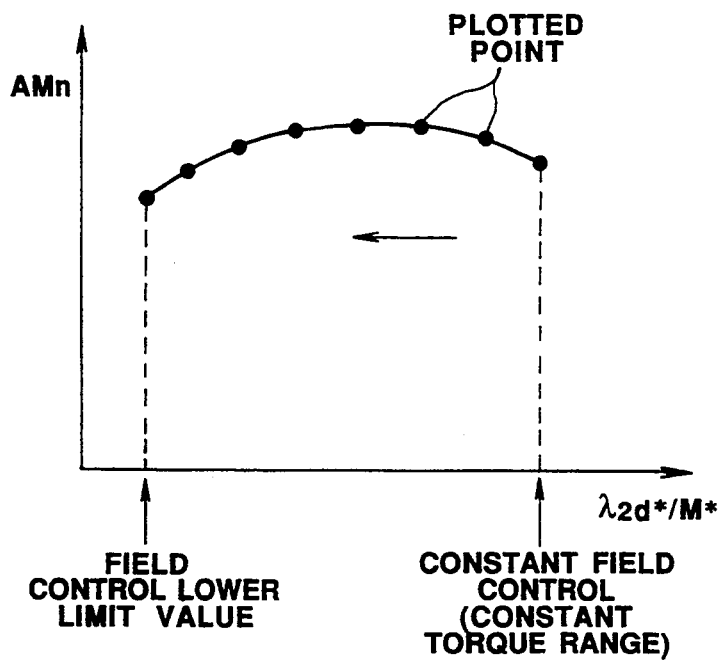
FIG. 10 is a characteristic graph indicating a variation data on the exciting inductance with respect to the exciting instruction.

As shown in FIG. 10, the derived data $A_{Mn}$ is formatted in the data table using the M' compensation circuit 12' and $A_{Mn}$ is derived according to the exciting instruction value through a straight line interpolation between the data (measured points).

As described hereinabove, in the induction motor vector control apparatus according to the present invention, the compensation of variation in the exciting inductance over the whole operation range is carried out so that the improvement in the torque control accuracy can be achieved.

In order to execute the tension constant control, the exciting instruction is varied in proportion to the coil diameter wound and the torque control accuracy can be more improved.

Various effects can be achieved according to the present invention.

It will fully be appreciated by those skilled in the art that the foregoing description has been made to the preferred embodiments and various changes and modifications may be made without departing from the scope of the present invention which is to be defined by the appended claims.

What is claimed is:

1. An induction motor vector control apparatus, comprising:

a) first means for deriving a target value of d-axis component $i_{1d}*$ and a target value of q-axis component $i_{1q}*$ of a primary current in the induction motor, said d and q axes being axes of a (d-q) coordinate system of cartesian coordinate system with a secondary magnetic flux being set as a reference axis and said (d-q) coordinate system being a rotating coordinate which rotates in synchronization with a power supply angular frequency of the induction motor;

b) a first coordinate conversion block which is so constructed as to calculate a target value $i_1\gamma*$ ($=I_1$) of a $\gamma$-axis component of the primary current and a phase $\phi$ on the basis of the derived target values of $i_{1d}*$ and $i_{1q}*$, said $\gamma$ axis and $\delta$ axis being on a $\gamma$-$\delta$ coordinate system which have a phase difference from the d-q axes by $\tan^{-1}(i_{1q}*/i_{1d}*)$ and with the primary current $I_1$ being a reference axis;

c) second means for calculating target values $v_1\gamma*$ and $v_1\delta*$ of the $\gamma$-axis component and the $\delta$-axis component of a primary voltage of the induction motor on the basis of a ratio of a target value $\lambda_{2d}*$ of the d-axis component of a secondary magnetic flux of the induction motor to a target value of M* of an exciting inductance ($\lambda_{2d}*/M*$), calculation results of the target value of $I_1$ and phase $\phi$ of the first coordinate conversion block, and an instruction value $\omega_o$ of the power supply angular frequency;

d) a second coordinate conversion block which is so constructed as to convert a detected value of the primary current in the induction motor into each γ-axis and δ-axis component $i_{1\gamma}$ and $i_{1\delta}$ of the γ-δ coordinate system; and e) a slip angular frequency calculation block which is so constructed as to calculate a slip angular frequency on a calculation formula including a set value of a secondary time constant, wherein said first means includes a first-order advance element calculation block which is so constructed as to receive a derived value of a division of a value derived from a division of the target value $\lambda_{2d}^*$ of the d-axis component of the secondary magnetic flux according to a rotor angular frequency of the induction motor by the target value $M^*$ of an exciting inductance of the induction motor by a variation of the exciting inductance $M'$ so that the target value of $i_{1d}^*$ is derived.

2. An induction motor vector control apparatus as set forth in claim 1, wherein said first means derives the target value $i_{1d}^*$ as follows:

$$i_{1d}^* = \left(\frac{\lambda_{2d}^*}{M^*}\right) \cdot \frac{1}{A_{Mn}} + S \cdot \frac{M'^*}{R_2'^*} \cdot \frac{\lambda_{2d}^*}{M^*}$$

wherein $A_{Mn} = \Delta V_1 \delta I_n / M^{2*}/L_2^* \cdot \omega_{On} \cdot \lambda_{2d}^*/M^*$, $\Delta v_1 \delta_n$ denotes an error voltage in the δ axis at a measuring point n, $\omega_{on}$ denotes a primary angular frequency at the measuring point n.

3. An induction motor vector control apparatus as set forth in claim 1, which further includes an iron loss compensation circuit which is so constructed as to calculate a value derived from the target value $\lambda_{2d}^*$ in the d-axis component of the secondary magnetic flux according to the rotor angular frequency of the induction motor divided by the target value $M^*$ of the exciting inductance and the variation of the exciting inductance so that the calculated output of the iron loss compensation circuit and the derived $i_{1q}^*$ are added to the first coordinate conversion block as a torque instruction value $i_{1q}'^*$.

4. An induction motor vector control apparatus as set forth in claim 2, wherein said exciting inductance $M'$ is formatted in a data table with respect to the primary angular frequency $\omega_o$.

5. An induction motor vector control apparatus as set forth in claim 4, said exciting inductance variation $A_{Mn}$ is formatted in a data table with respect to an exciting instruction $\lambda_{2d}^*/M^*$.

6. An induction motor vector control apparatus as set forth in claim 5, wherein said first-order advance element calculation block receives a division value of the exciting instruction $\lambda_{2d}^*/M^*$ using the data table formatted exciting inductance variation $A_{Mn}$ and outputs the division value of the primary current target value $i_{1d}^*$.

7. An induction motor vector control apparatus as set forth in claim 5, said first means derives the target value $i_{1d}^*$ of the primary current by dividing the exciting instruction $\lambda_{2d}^*/M^*$ using the data table formatted exciting inductance variation $A_{Mn}$ and adding the derived divided value to a differential term of the first-order advance element calculation block.

8. An induction motor vector control apparatus as set forth in claim 5, wherein said iron loss compensation circuit receives the exciting instruction $\lambda_{2d}^*/M^*$, and the data table formatted exciting inductance variation $A_{Mn}$ and calculates the torque instruction value $i_{1q}'^*$ by the addition of the derived output thereof to the target value $i_{1q}^*$ of the primary current.

9. A vector control apparatus comprising:
a) an induction motor;
b) detecting means for detecting a rotor angular frequency $\omega_r$ of the induction motor;
c) secondary magnetic instruction amplifying means for deriving a ratio of a target value of a secondary magnetic flux in a d-axis component to a target value of an exciting inductance $\lambda_{2d}^*/M^*$ according to the rotor angular frequency $\omega_r$;
d) a first-order advance element circuit which calculates as follows: $i_{1d}^* = \lambda_{2d}^*/M^* \, (1 + L_2^*/R_2^* \cdot S)$, wherein $i_{1d}^*$ denotes a target value of a primary current in the induction motor in the d-axis component, $L_2^*$ denotes a target value of a secondary inductance, and $R_2^*$ denotes a target value of a secondary resistance, S denotes differential operator;
e) (d, q)−(γ,δ) coordinate conversion block which is so constructed as to receive $i_{1d}^*$ and $i_{1q}'^*$ (a target value of the primary current in the induction motor in a q-axis component, said d and q being in a d-q coordinate system which is rotated in synchronization with a power supply angular frequency, with a secondary magnetic flux in the induction motor as a reference axis and as to calculate the following phase difference $\phi$, $i_{1\gamma}^*$, $\sin\phi$, and $\cos\phi$:

$$\tan^{-1}(i_{1q}'^*/i_{1d}^*) = \phi,$$

$$\sqrt{i_{1d}^{*2} + 1_{1q}'^{*2}} = I_1,$$

wherein $I_1$ denotes a primary current of the induction motor, $I_1$ comprises an $i_{1\gamma}^*$ component and $i_{1\delta}^*$ component in γ-δ axes of γ-δ coordinate system with the primary current $I_1$ as a reference axis;
f) an ideal voltage calculation block which is so constructed as to calculate the following:

$$v_{1\gamma}^* = R_1 i_{1\gamma}^* + M^{2*}/L_2^* \cdot \omega_o \cdot \lambda_{2d}^*/M^* \cdot \sin\phi$$

$$v_{1\delta}^* = L_\sigma \omega_o i_{1\gamma}^* M^{2*}/L_2 \cdot \omega_o \cdot \lambda_{2d}^*/M^* \cdot \cos\phi$$

wherein $\omega_o$ denotes a power supply angular frequency;
g) a slip angular frequency calculation block which is so constructed as to calculate the slip angular frequency $\omega_s^*$ on the basis of $i_{1q}^*$ and $\lambda_{2d}^*/M^*$;
h) a secondary resistance $R_2$ compensation amplifying means for calculating a secondary resistance variation K on the basis of $\Delta v_1 \delta$ wherein $\Delta v_1 \delta$ denotes an error voltage of the primary voltage $v_1$ in the δ axis;
i) an $M'$ compensator which is so constructed as to calculate a variation in an exciting inductance on the basis of the following equation:

$$A_{Mn} = \Delta v_1 \delta_{In}/M^{2*}/L_2^* \cdot \omega_{on} \cdot \lambda_{2d}^*/M^*$$

wherein $\Delta v_1 \delta_{In}$ denotes δ-axis error voltage at a measuring point n of the speed during no load operation, $\omega_o$ denotes a primary angular frequency at the measuring point n from the slip angular frequency calculation block; and
j) a divider which receives both $\lambda_{2d}^*/M^*$ from the secondary magnetic flux instruction amplifier and $A_{Mn}$ from the M' compensator and carries out a division so that a variation in the exciting inductance is compensated for $i_{1d}*$.

10. A vector control apparatus as set forth in claim 9, wherein said slip angle frequency circuit calculates $\omega_s*$ as follows:

$$\omega_s* = R'_2*/M'* \cdot i_{1q}*/\alpha_{2d}*/M*$$

wherein $R'_2 = (M/L_2)^2 \cdot R_2$, $M' = M^2/L_2$.

11. A vector control apparatus as set forth in claim 9, wherein said first-order advance element circuit calculates $i_{1d}* = \lambda_{2d}*/M* \times (1 + S \cdot M'*/R'_2*)$.

12. A vector control apparatus as set forth in claim 11, wherein said first-order advance element circuit calculates $i_{1d}* = (\lambda_{2d}*/M*) \cdot 1/A_{Mn} + S \cdot M'*/R'_2* \cdot \lambda_{2d}*/M*$.

13. A vector control apparatus as set forth in claim 12, which further includes an iron loss compensator which is so constructed as to calculate the iron loss compensation formula as: $T_{RM} = R_m*/M* \times 1/A_{Mn} \times \lambda_{2d}*/M* \times 1/A_{Mn} \times 1/\omega_{ho}$.

14. A vector control apparatus as set forth in claim 13, wherein said slip angular frequency calculation block calculates as follows:

$$\omega_{sn} = (1 + K_n) \cdot \omega_{s(n-1)}$$

and wherein $\omega_{sn}$ is derived as $\omega_s$ is added to the detected rotor angular frequency $\omega_r$ to derive $\omega_o$ which is a target value of the power supply angular frequency and is supplied to the M' compensator and iron loss compensator.

* * * * *